United States Patent
Falkenberg et al.

(10) Patent No.: US 8,799,759 B2
(45) Date of Patent: Aug. 5, 2014

(54) PRE-RENDERING WEB CONTENT

(75) Inventors: Matthias Falkenberg, Stuttgart (DE); Richard Jacob, Ostfildern (DE); Stephan Laertz, Herrenberg (DE); Sascha Sambale, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 12/966,282

(22) Filed: Dec. 13, 2010

(65) Prior Publication Data
US 2012/0151308 A1 Jun. 14, 2012

(51) Int. Cl.
G06F 17/00 (2006.01)
G06F 17/30 (2006.01)
H04L 29/08 (2006.01)
G06F 17/22 (2006.01)

(52) U.S. Cl.
CPC ...... *G06F 17/30902* (2013.01); *H04L 67/2847* (2013.01); *H04L 67/2842* (2013.01); *G06F 17/2247* (2013.01)
USPC .......... 715/205; 709/203; 709/217; 709/219; 715/234; 715/760

(58) Field of Classification Search
CPC .......... G06F 17/2247; G06F 17/30902; H04L 67/2842; H04L 67/2847
USPC ......... 715/200–203, 205, 234, 236, 760, 822, 715/853, 860; 709/203, 217–219, 223–224, 709/227–229; 707/E17.12, E17.107, 707/E17.119; 705/14.52–14.53
See application file for complete search history.

(56) References Cited

U.S. PATENT DOCUMENTS

| | | | |
|---|---|---|---|
| 5,978,841 A | 11/1999 | Berger | |
| 6,182,133 B1* | 1/2001 | Horvitz | 709/223 |
| 6,557,015 B1* | 4/2003 | Bates et al. | 715/229 |
| 6,721,780 B1 | 4/2004 | Kasriel et al. | |
| 8,438,487 B1* | 5/2013 | Lin-Hendel | 715/739 |
| 2002/0163545 A1* | 11/2002 | Hii | 345/838 |
| 2005/0223329 A1* | 10/2005 | Schwartz et al. | 715/711 |
| 2006/0047804 A1* | 3/2006 | Fredricksen et al. | 709/224 |
| 2006/0070012 A1* | 3/2006 | Milener et al. | 715/822 |

(Continued)

FOREIGN PATENT DOCUMENTS

WO 2008094712 A2 8/2008

OTHER PUBLICATIONS

Bouras et al.,"Predictive Prefetching on the Web and its Potential Impact in the Wide Area," WWW: Internet & Web Information Systems, 7, pp. 143-179, © 2004, Kluwer Academic Publishers.*

(Continued)

*Primary Examiner* — Cesar Paula
*Assistant Examiner* — James H Blackwell
(74) *Attorney, Agent, or Firm* — Holland & Knight LLP; Brian J. Colandreo, Esq.; Jeffrey T. Placker, Esq.

(57) ABSTRACT

A method and computer program product for pre-rendering web content is described. A method may comprise receiving, via a computing device, an implicit indication of a request for web content associated with a web element. The method may further comprise pre-rendering the web content associated with the web element based upon, at least in part, the implicit indication of the request for the web content.

18 Claims, 5 Drawing Sheets (56) References Cited

U.S. PATENT DOCUMENTS

2006/0294223 A1* 12/2006 Glasgow et al. ............. 709/224
2008/0082509 A1* 4/2008 Bessieres et al. ................ 707/3
2008/0301300 A1* 12/2008 Toub ............................ 709/227
2009/0327076 A1 12/2009 Sinyagin et al.

OTHER PUBLICATIONS

Jiang et al.,"Web Prefetching in a Mobile Environment," IEEE Personal Communications, pp. 25-34, © 1998, IEEE.*
Lan et al.,"Rule-Assisted Prefetching in Web-Server Caching," CIKM 2000, McClean, VA USA, pp. 504-511, © 2000 ACM.*
Padmanabhan et al.,"Using Predictive Prefetching to Improve World Wide Web Latency," © 1996, ACM, pp. 22-36.*
Wang, Jia,"A Survey of Web Caching Schemes for the Internet," © 1999 ACM, pp. 36-46.*
C. Morimoto et al., "Keeping an Eye for HCI," 2012 25th SIBGRAPI Conference on Graphics, Patterns and Images, p. 171, XII Brazilian Symposium on Computer Graphics and Image Processing, 1999.*
R. Jacob,"What You Look at is What You Get: Eye Movement-Based Interaction Techniques," © 1990 ACM, pp. 11-18.*
Jyoti et al.,"A Framework for Prefetching Relevant Web Pages using Predictive Prefetching Engine (PPE)," DCSI International Journal of Computer Science Issues, vol. 7, Issue 6, Nov. 2010, pp. 246-255.*
Dahlan et al.,"Implementation of Asynchronous Predictive Fetch to Improve the Performance of Ajax-enabled Web Applications," iiWAS2008, Nov. 24-28, 2008, Linz, Austria © 2008 ACM, pp. 345-350.*
Lee et al., "Caching Best Practices With Pitney Bowes Business Insight Tile Servers," White Paper, 2009, Pitney Bowes Business Insight, http://www.pbinsight.com/files/resource-library/resource-files/caching-white-paper.pdf; pp. 1-8.
Ceri et al., "An Approach to User-Behavior Aware Web Applications," Dipartimento di Elettronica e Informazione, Politecnico di Milano, http://www.webml.org/webml/upload/ent5/2/reactiveweb.pdf; Web Engineering (2005), pp. 417-428.
Larrabeiti et al., "Charging for Web Content Pre-Fetching in 3G Networks," Universidad Carlos III de Madrid, http://www.it.uc3m.es/muruenya/papers/opium_charging_icq04.pdf; (2005) pp. 358-367.

* cited by examiner

PRE-RENDERING WEB CONTENT

BACKGROUND OF THE INVENTION

A server may deliver the output of web applications or web content to a client upon receiving a request. The request may be issued when a user submits a form or selects a hyperlink displayed on a web page that references the web application or web content. Users may expect a prompt response without considerable delay, however computing the output of web applications or web content to display on a web page may consume time.

BRIEF SUMMARY OF THE INVENTION

In a first embodiment, a method may comprise, receiving, via a computing device, an implicit indication of a request for web content associated with a web element. The method may further comprise pre-rendering the web content associated with the web element based upon, at least in part, the implicit indication of the request for the web content.

One or more of the following features may be included. The method may include displaying the web content at the computing device based upon, at least in part, an explicit request for the web content. The method may also include delivering the pre-rendered web content to the computing device based upon, at least in part, an explicit request for the web content. The web content may be linked from the web element. The implicit indication may include, at least in part, at least one of: a cursor action associated with the web element, a clicking action associated with the web element, camera feedback, an explicit request for web content, and accessing web content. The web element may be at least one of: text, lines of text, a link, an image, video content, audio content, and web content.

In some implementations, pre-rendering the web content may be further based upon, at least in part, at least one of: a navigation profile of a user, and a history of web content being pre-rendered without being explicitly requested. The pre-rendered web content may be stored in a cache until, at least one of: the web content has been delivered, the web content changes after a time frame, and the time frame ends without explicit request for the web content. The implicit indication may be based upon, at least in part, camera feedback associated with a user's action. The implicit indication may also be based upon, at least in part, at least one of: a right clicking action associated with the web element, and selection of a key configured, at least in part, to allow a user to launch at least one of: a new web browser window, and a new web browser tab.

In a second embodiment, a computer program product may reside on a computer readable storage medium and may have a plurality of instructions stored on it. When executed by a processor, the instructions may cause the processor to perform operations comprising receiving an implicit indication of a request for web content associated with a web element. The operations may further comprise pre-rendering the web content associated with the web element based upon, at least in part, the implicit indication of the request for the web content.

One or more of the following features may be included. The operations may include displaying the web content at the computing device based upon, at least in part, an explicit request for the web content. The operations may also include delivering the pre-rendered web content to the computing device based upon, at least in part, an explicit request for the web content. The web content may be linked from the web element. The implicit indication may include, at least in part, at least one of: a cursor action associated with the web element, a clicking action associated with the web element, camera feedback, an explicit request for web content, and accessing web content. The web element may be at least one of: text, lines of text, a link, an image, video content, audio content, and web content.

In some implementations, pre-rendering the web content may be further based upon, at least in part, at least one of: a navigation profile of a user, and a history of web content being pre-rendered without being explicitly requested. The pre-rendered web content may be stored in a cache until, at least one of: the web content has been delivered, the web content changes after a time frame, and the time frame ends without explicit request for the web content. The implicit indication may be based upon, at least in part, camera feedback associated with a user's action. The implicit indication may also be based upon, at least in part, at least one of: a right clicking action associated with the web element, and selection of a key configured, at least in part, to allow a user to launch at least one of: a new web browser window, and a new web browser tab.

The details of one or more implementations are set forth in the accompanying drawings and the description below. Other features and advantages will become apparent from the description, the drawings, and the claims.

DETAILED DESCRIPTION OF THE INVENTION

Figure 1:
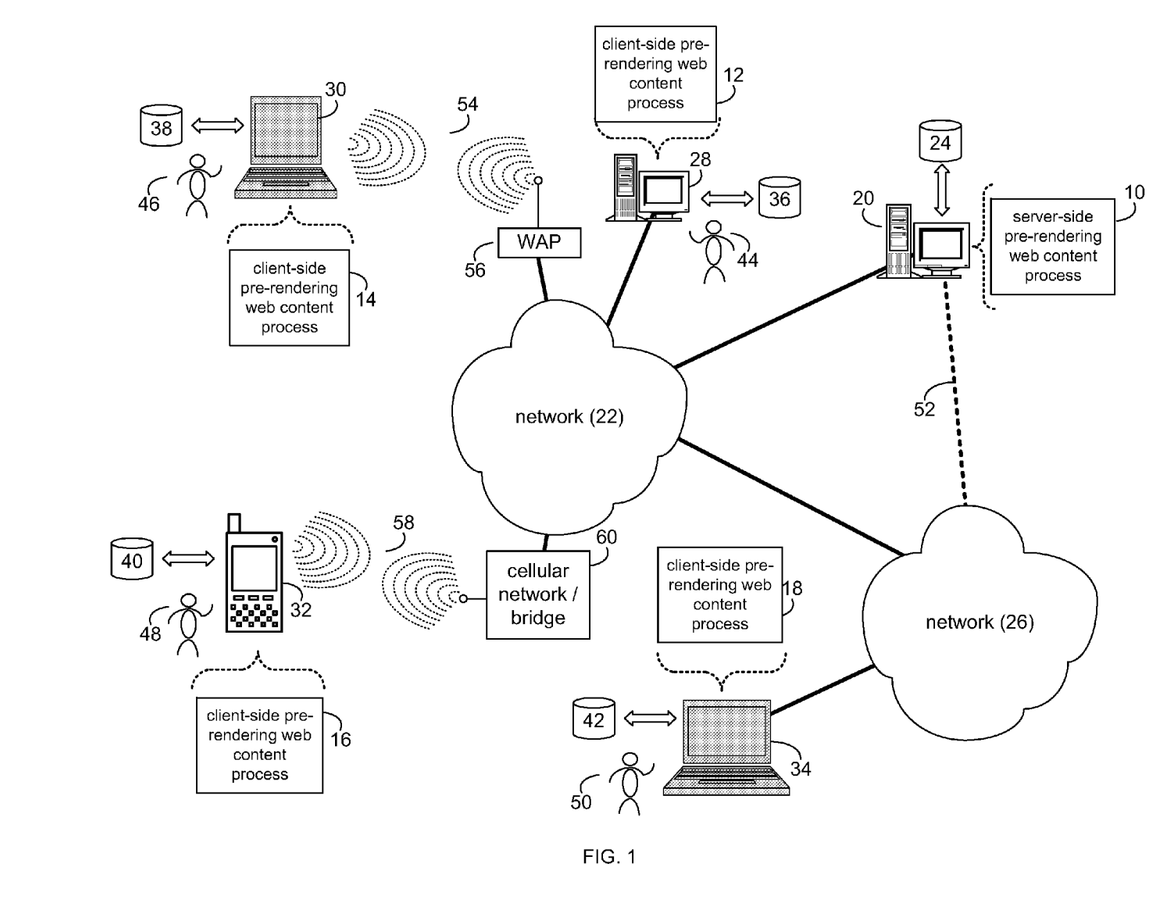
FIG. 1 is a diagrammatic view of a pre-rendering web content process coupled to a distributed computing network.
Figure 2:
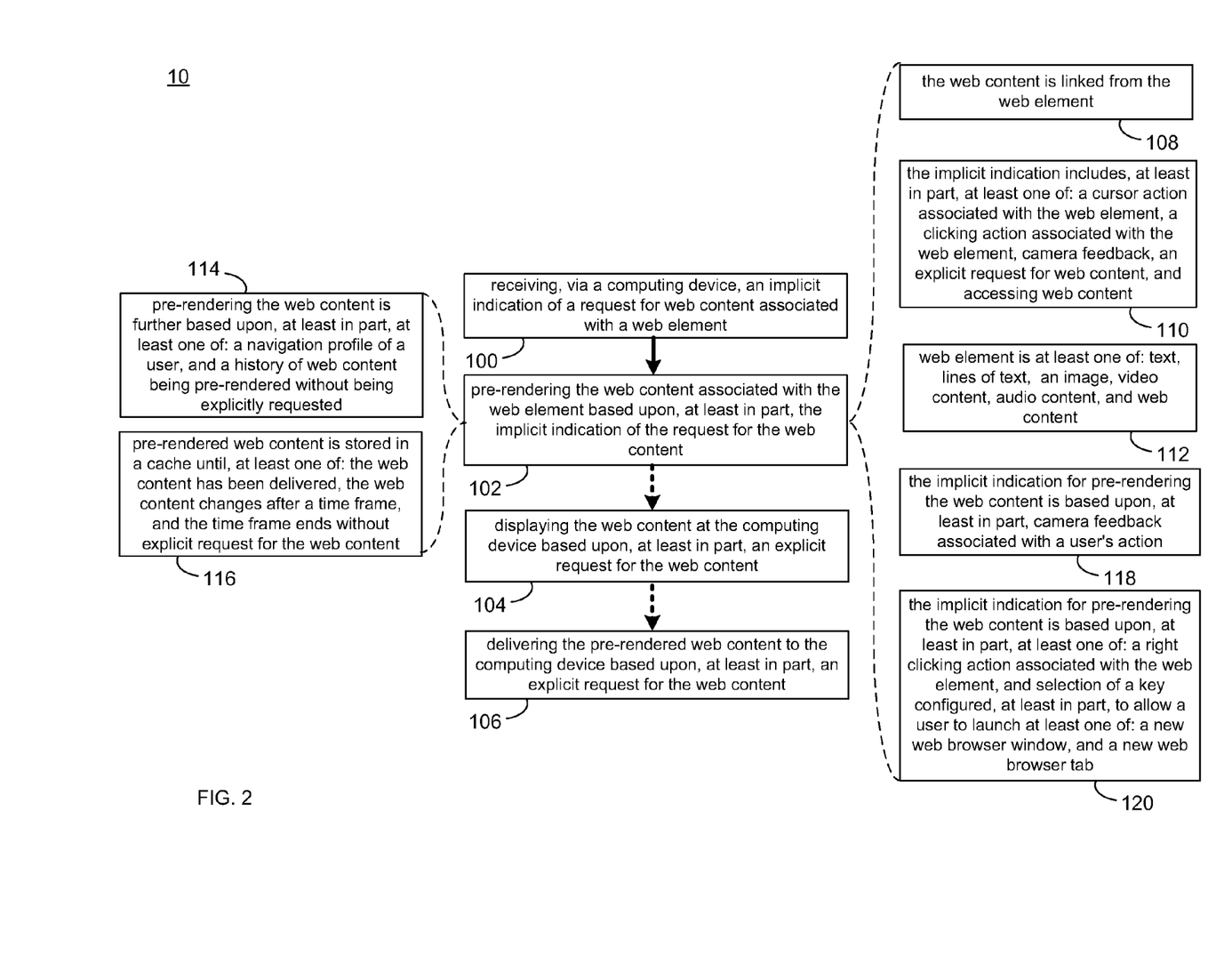
FIG. 2 is a flowchart of the pre-rendering web content process of FIG. 1.

Referring to FIGS. 1 & 2, there is shown a pre-rendering web content process 10. As will be discussed below, pre-rendering web content process 10 may receive 100 an implicit indication of a request for web content associated with a web element. Pre-rendering web content process 10 may also pre-render 102 the web content associated with the web element based upon, at least in part, the implicit indication of the request for the web content.

Pre-rendering web content (PWC) process may be a server-side process (e.g., server-side PWC process 10), a client-side process (e.g., client-side PWC process 12, client-side PWC process 14, client-side PWC process 16, or client-side PWC process 18), or a hybrid server-side/client-side process (e.g., the combination of server-side PWC process 10 and one or more of client-side PWC processes 12, 14, 16, 18).

Server-side PWC process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side PWC process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side PWC processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side PWC processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side PWC processes 12, 14, 16, 18 and/or server-side PWC process 10 may be processes that run within (i.e., are part of) a web browser application. Alternatively, client-side PWC processes 12, 14, 16, 18 and/or server-side PWC process 10 may be stand-alone applications that work in conjunction with the web browser application. One or more of client-side PWC processes 12, 14, 16, 18 and server-side PWC process 10 may interface with each other (via network 22 and/or network 26). In one implementation client-side PWC processes 12, 14, 16, 18 and/or server-side PWC process 10 may be processes that run within or in connection with a web hosting application.

Users 44, 46, 48, 50 may access server-side PWC process 10 directly through the device on which the client-side PWC process (e.g., client-side PWC processes 12, 14, 16, 18) is executed, namely client electronic devices 28, 30, 32, 34, for example. Users 44, 46, 48, 50 may access server-side PWC process 10 directly through network 22 and/or through secondary network 26. Further, server computer 20 (i.e., the computer that executes server-side PWC process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Pre-Rendering Web Content Process

Web content (e.g., a web page, media content, a web application, and/or output of a web application) may be pre-rendered and/or cached by a server computer hosting the web content. Web content may also be pre-rendered and/or cached by a server computer located between the originating server and a client (e.g., a proxy server), by the client (e.g., a client electronic device), or by a combination of the server computer, proxy server, and client electronic device. This may improve response times for displaying web content when requested by a user.

However, when delivered from cache, the web content may not be computed or built in response to the user's request. As such, caching may only be applied to dynamic web content with limitations, and old or outdated web content may be delivered to the user. Also, opportunities for caching dynamic web content may be limited. A server computer may have to compute or build the dynamic web content after receiving a corresponding request from a user. In this situation, the response time for displaying the web content to the user may include the time it takes to compute or build the output of the requested web content.

Pre-rendering web content (PWC) process 10 may consider one or more behavioral patterns of a user to trigger pre-rendering of web content. Further, PWC process 10 may cache the pre-rendered web content. For the following discussion, server-side PWC process 10 will be described for illustrative purposes. It should be noted that client-side PWC process 12 may be incorporated into server-side PWC process 10 and may be executed within one or more applications that allow for communication with client-side PWC process 12. However, this is not intended to be a limitation of this disclosure, as other configurations are possible (e.g., stand-alone, client-side PWC processes and/or stand-alone server-side PWC processes.) For example, some implementations may include one or more of client-side PWC processes 14, 16, 18 in place of or in addition to client-side PWC process 12.

Referring now to FIGS. 1-5, PWC process 10 may receive 100 an implicit indication (e.g., via cursor 416) of a request for web content (e.g., one or more of web pages 400a-400c, video content 410, audio content 412, web application 406, and/or web application output 406a and 406b) associated with a web element. The web element may be (112) at least one of text (e.g., text 402, 408), lines of text (e.g., lines of text 404), a link (e.g., links 408a, 408b), video content (e.g., video content 410), audio content (e.g., audio content 412), an image (e.g., image 414), and/or other web content (e.g., button 416). It should be noted that the terms "web content" and "web element" both may refer to items on a web page or otherwise viewable through a web browser. Further, an item referred to on a web page may be both web content and a web element (e.g., video content 410, audio content 412, and/or button 416). Web content (e.g., video content 410) may be linked (108) from a web element (e.g., link 408a).

Figure 4:
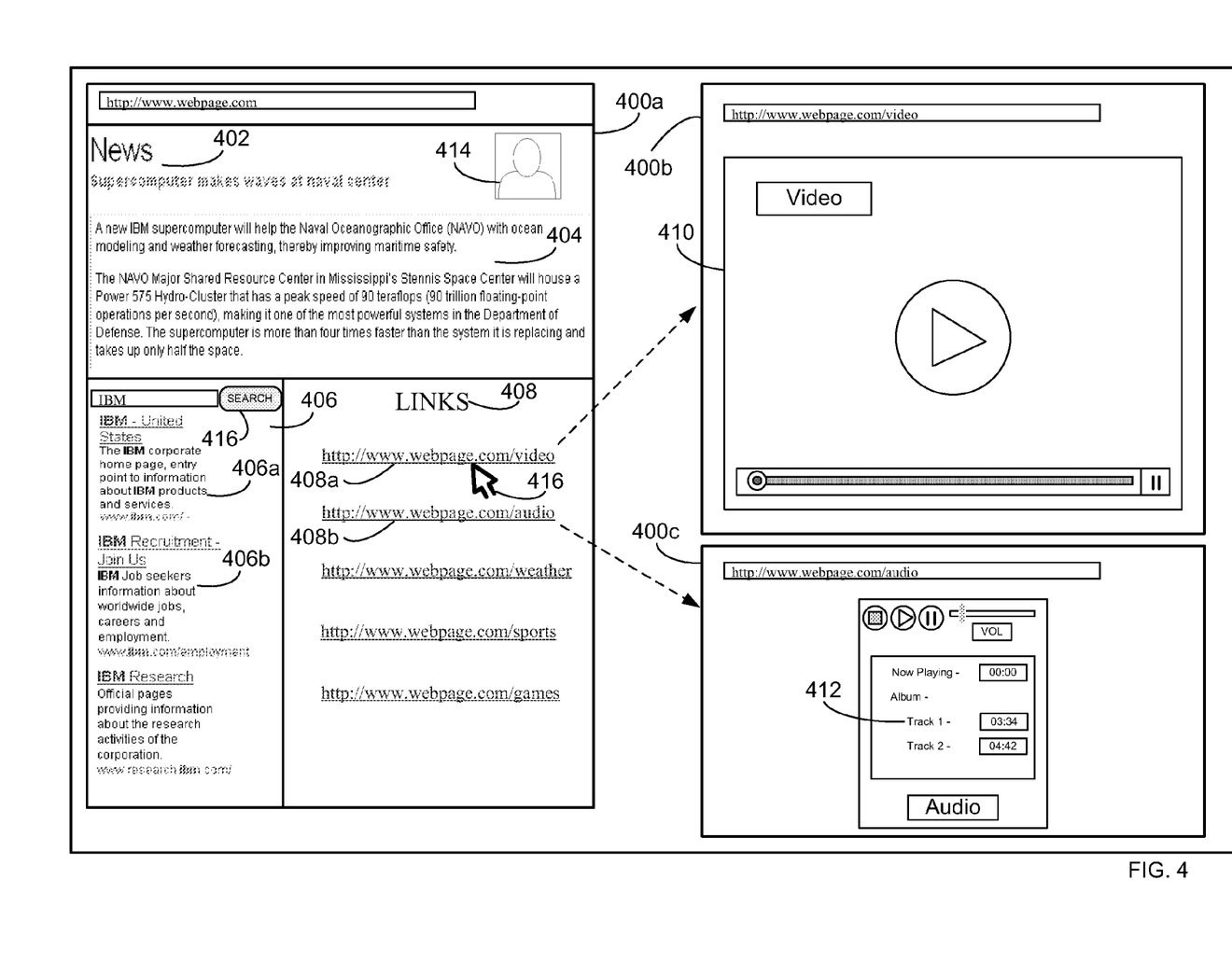
FIG. 4 is an exemplary website that may be associated with the pre-rendering web content process of FIG. 1.
Figure 5:
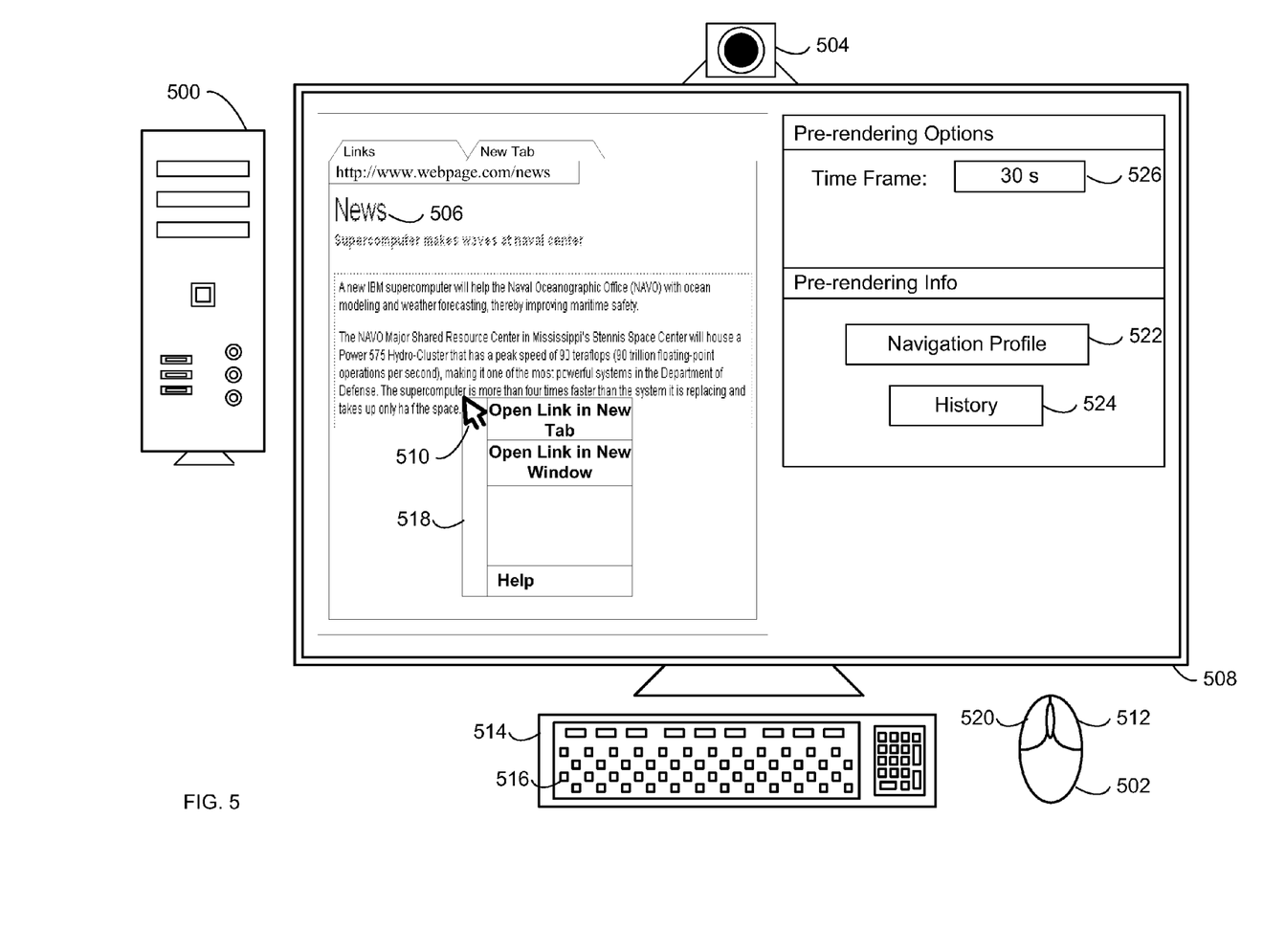
FIG. 5 is an exemplary computer system that may be associated with the pre-rendering web content process of FIG. 1.

The implicit indication may include (110), at least in part, at least one of a cursor action (e.g., hovering of cursor 416) associated with the web element (e.g., link 408a), a clicking action (e.g., via mouse 502) associated with the web element (e.g., link 408a), camera feedback (e.g., via camera 504), an explicit request for web content (e.g., video content 410 and/or audio content 412), and accessing web content (e.g., one or more of web pages 400a-400c, web application 406, web application output 406a and 406b, video content 410, and/or audio content 412). PWC process 10 may pre-render 102 the web content (e.g., one or more of web pages 400a-400c, web application 406, web application output 406a and 406b, video content 410, and/or audio content 412) associated with the web element (e.g., text 402, 408, lines of text 404, links 408a, 408b, video content 410, audio content 412, image 414, and/or button 416) based upon, at least in part, the implicit indication (e.g., hovering of cursor 416) of the request for the web content.

Figure 3:
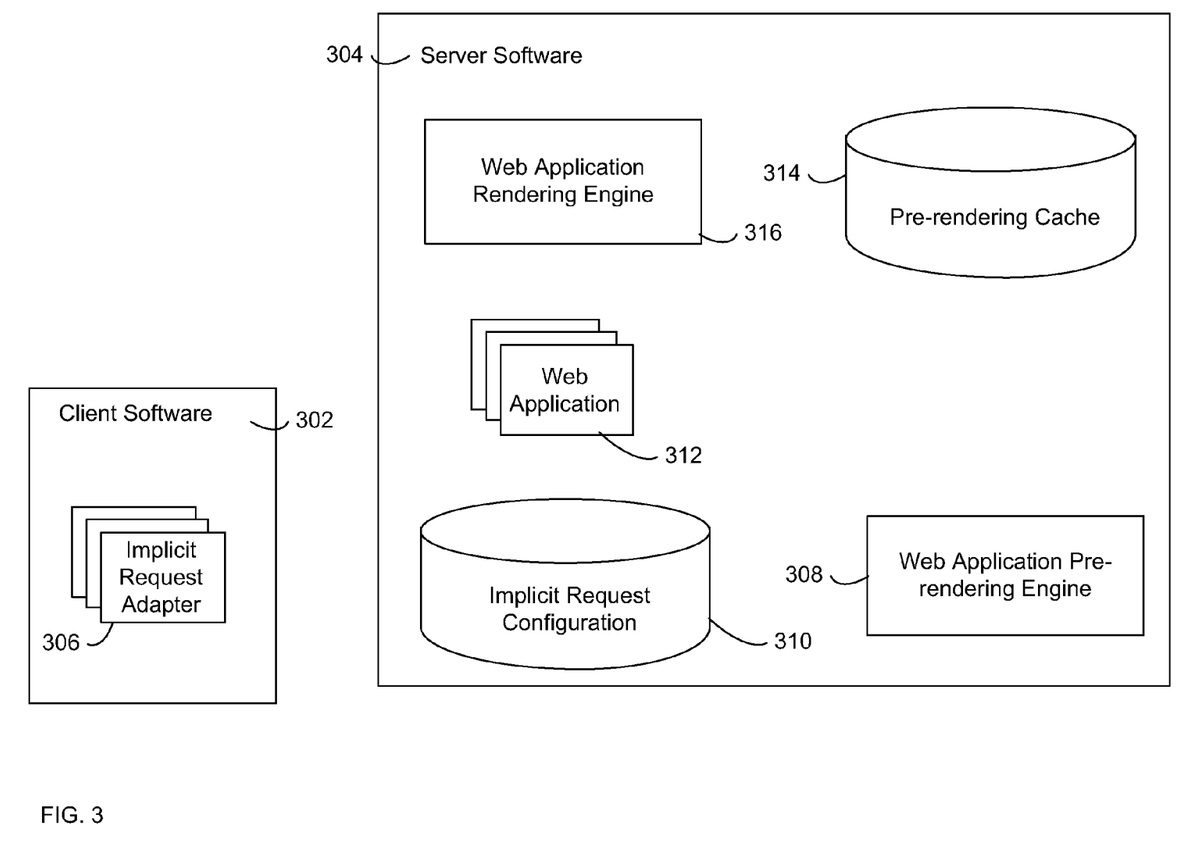
FIG. 3 is a diagram of components which may be associated with the pre-rendering web content process of FIG. 1.

For example, assume a user (e.g., users 44, 46, 48, 50) accesses client software 302 to access web page 400a. Client software 302 may be a web browser or other application used to access web pages. Further, assume web page 400a is hosted by server computer 20, which may run server software 304. Server software 304 may be used in connection with server computer 20 to deliver web page 400a to one or more of client electronic devices 28, 30, 32, and 34, each of which may run client software 302. User 44, for example, may interact with web page 400a, which may be displayed by client software 302. PWC process 10 may run in connection with client software 302, server software 304, or both.

Client software 302 may include one or more implicit request adapters (e.g., implicit request adapter 306), which may be configured to detect one or more behavioral patterns of user 44. For example, user 44 may use a pointer device (e.g., mouse 502) to interact with web page 400a via a cursor (e.g., cursor 416). User 44 may view link 408a and may hover cursor 416 over link 408a because user 44 may be interested in web page 400b and/or video content 410. Implicit request adapter 306 may be configured to detect when user 44 hovers over a link (e.g., link 408a). Further, PWC process 10 may, via implicit request adapter 306, receive 100 an implicit indication (e.g., hovering cursor 416 over link 408a) of a request for web page 400b and/or video content 410 associated link 408a. For example, implicit request adapter 306 may notify server software 304 of user 44's implicit request (e.g., hovering cursor 416 over link 408a) of web page 400b and/or video content 410.

Web content may be associated with a web application which may process the web content, user inputs, or user commands in order to generate the output desired by the user. For example, video content 410 may be associated with web application 312, which may process video content 410 for user 44 to view. Server software 304 may include one or more web applications (e.g., web application 312) in order to process web content, user inputs, and/or user commands (e.g., video content 410). The web content may reference the web application such that when the web content is requested, the web application is run in response in order to render the web content. Server software 304 may also include web application pre-rendering engine 308, which may check a configuration (e.g., implicit request configuration 310) of a referenced web application (e.g., web application 312) in order to determine whether or not the type of implicit request (e.g., hovering cursor 416 over link 408a) should trigger pre-rendering of the web content (e.g., video content 410) and/or the web application (e.g., web application 312). If the implicit request (e.g., hovering cursor 416 over link 408a) should trigger the pre-rendering of the web content (e.g., video content 410) and/or the web application (e.g., web application 312), PWC process 10 may check pre-rendering cache 314 to see if the web content (e.g., video content 410) and/or the web application (e.g., web application 312) has already been pre-rendered and stored there.

Continuing with the example above, if the web content (e.g., video content 410) and/or the web application (e.g., web application 312) has not been pre-rendered and stored in pre-rendering cache 314, web application pre-rendering engine 308 may request web application rendering engine 316 to pre-render the web content (e.g., video content 410) and/or the web application (e.g., web application 312) and return the result. In this way, PWC process 10 may pre-render 102 the web content (e.g., video content 410 and/or the web application 312) associated with the web element (e.g., link 408a) based upon, at least in part, the implicit indication (e.g., hovering cursor 416 over link 408a) of the request for the web content (e.g., video content 410 and/or the web application 312). PWC process 10 may further store the pre-rendered web content in pre-rendering cache 314. It should be noted that the term "pre-render" as used herein may refer to accumulating the data necessary to compute, build, and/or render the web content, web page, web application, or output of the web application, as may be implicitly requested by the user.

Further, user 44 may explicitly request the web content (e.g., video content 410) that was implicitly requested (e.g., by hovering cursor 416 over link 408a). For example, user 44 may click on link 408a, via, e.g., mouse 502, which may indicate an explicit request to render web page 400b and/or video content 410. As such, client software 302 may request server software 304 to render the explicitly requested web content (e.g., web page 400b and/or video content 410). Web application rendering engine 316 may check pre-rendering cache 314 to find an entry corresponding to the explicitly requested web content (e.g., web page 400b and/or video content 410). Assume, for example, that pre-rendered web page 400b and/or video content 410 were stored in pre-rendering cache 314 in response to an implicit request. Web application rendering engine 316 may find pre-rendered web page 400b and/or video content 410 in pre-rendering cache 314. Further, server software 304 may deliver pre-rendered web page 400b and/or video content 410 to client software 302, and client software 302 may display pre-rendered web page 400b and/or video content 410 to user 44. In this way PWC process 10 may deliver 106 pre-rendered web content (e.g., pre-rendered web page 400b and/or video content 410) to the computing device (e.g., one or more of client electronic devices 28, 30, 32, 34) based upon, at least in part, an explicit request (e.g., clicking link 408a via mouse 502) for the web content (e.g., web page 400b and/or video content 410). Further, PWC process 10 may display 104 the web content (e.g., web page 400b and/or video content 410) at the computing device (e.g., one or more of client electronic devices 28, 30, 32, 34) based upon, at least in part, an explicit request (e.g., clicking link 408a via mouse 502) for the web content (e.g., web page 400b and/or video content 410).

In an implementation, the implicit indication for pre-rendering the web content may be (118) based upon, at least in part, camera feedback (e.g., via camera 504) associated with a user's action. For example, user 44 may follow lines of news clip 506 displayed on monitor 508 via client electronic device 500 with user 44's eyes. Camera 504 may be in communication with client electronic device 500, which may be configured to operate in connection with PWC process 10, and may be used by PWC process 10 detect that user 44 is following lines of news clip 506 with user 44's eyes. PWC process 10 may also detect that user 44 is following text of news clip 506 via cursor 510. Further, PWC process 10, which may run in connection with client electronic device 500, may determine that one or more of these detections are an implicit indication of a request for the full news story (not shown), which may be linked from the text of news clip 506. PWC process 10 may then pre-render the full new story in a manner similar to that described above, in anticipation of an explicit request for the full news story by user 44.

It should be noted that while various web elements are described above, PWC process 10 may detect an implicit indication of a request for web content based upon a user's actions in connection with other web elements. For example PWC process 10 may detect an implicit request for web content if user 44 examines one or more images (e.g., image 414) linked to the web content. User 44 may examine image 414 by moving cursor 416 within the boarders of image 414 or by focusing on image 414 with user 44's eyes, which may be detected by e.g., camera 504. Further, user 44 may select one or more pagination elements (not shown) which may render subsequent portions of an article or book. PWC process 10 may detect that user 44 is implicitly requesting the entire contents of the article or book, and may as such pre-render the entire contents of the article of book. In another example, user 44 may explicitly request multiple links (e.g., links 408a and 408b) on a single web page (e.g., web page 400a). PWC process 10 may detect that user 44 is implicitly requesting the web content linked with each link on web page 400a, and may pre-render the web content associated with each link on web page 400a in anticipation of user 44 requesting all the web content.

Also, in an implementation, the implicit indication for pre-rendering the web content may be (120) based upon, at least in part, at least one of a right clicking action associated with a web element (e.g., via right-mouse button 512), and selection of a key (e.g., control key 514 of keyboard 516) configured, at least in part, to allow a user to launch at least one of a new web browser window, and a new web browser tab (e.g., via popup window 518). For example, user 44 may click right-mouse button 512 with cursor 510 hovered over news clip 506, and in response, popup window 518 may be rendered. In another example, user 44 may push control key 516 on keyboard 514 in connection with clicking mouse button 520 with cursor 510 hovered over news clip 506, and in response, popup window 518 may be rendered. Popup window 518 may allow user 44 to open linked content (e.g., the full news story, not shown) in a new tab, or in a new window. News clip 506 may be linked to another web page (not shown) including the full new story (not shown). Further, PWC process 10 may be configured to detect that the right-click action and/or control key selection by user 44 is an implicit indication by user 44 to request the full news story, and may pre-render the full news story in a manner similar to that described above, in anticipation of an explicit request for the full news story by user 44 (i.e., before user 44 explicitly requests to open the linked content in a new tab or new window).

Further, in an implementation, pre-rendering 114 the web content may be further based upon, at least in part, at least one of: a navigation profile of a user (e.g., a navigation profile which may be accessed via button 522), and a history of web content (e.g., a history which may be accessed via button 524) being pre-rendered without being explicitly requested. For example, user 44 may select button 522 to render a navigation profile options window (not shown). User 44 may select, via the navigation profile options window, a number of navigation profile options including, but not limited to: user 44's favorite websites, how long user 44's cursor should be hovered over linked content before pre-rendering it, and user 44's favorite web content (e.g., video content, audio content). Further, user 44 may select button 524 to render a history window (not shown). The history window may show a history of web content pre-rendered by PWC process 10 without being explicitly requested. PWC process 10 may analyze the navigation profile, history, or both, of user 44 in order to determine when to pre-render web content which may be implicitly requested by user 44.

Additionally, in an implementation, the pre-rendered web content may be (116) stored in a cache (e.g., pre-rendering cache 314) until, at least one of, the web content has been delivered, the web content changes after a time frame (e.g., time frame 526), and the time frame (e.g., time frame 526) ends without explicit request for the web content. For example, user 44 may implicitly request web content, which may then be pre-rendered and cached by PWC process 10 as described above. For example, if user 44 subsequently explicitly requests the web content and it is delivered, PWC process 10 may delete the pre-rendered web content from pre-rendering cache 314 because it may be unlikely that user 44 will explicitly request the web content again. Alternatively, user 44 may not explicitly request the web content after an adjustable time frame (e.g., time frame 526 shown in FIG. 5 as 30 seconds), and PWC process 10 may delete the pre-rendered web content from pre-rendering cache 314 because it may be unlikely that user 44 ever requests the web content. In another example, user 44 may subsequently explicitly request the web content, but the web content may have changed since it was pre-rendered. PWC process 10 may then delete the pre-rendered web content from pre-rendering cache 314 because it may need to be rendered again in order to provide user 44 with up-to-date content. In other words, the pre-rendered web content stored in the cache may expire after an adjustable time frame (e.g., time frame 526) for one or more of the reasons above.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:
1. A method comprising:
  displaying a single web page that includes one or more web elements;
  receiving, via a computing device, an implicit indication of a request for web content associated with a web element of the one or more web elements;
  pre-rendering the web content associated with the web element based upon, at least in part, the implicit indication of the request for the web content, wherein the implicit indication includes feedback from a camera detecting a specific item viewed by a user, and wherein pre-rendering the web content is further based upon, at least in part, a history of implicitly requested pre-rendered web content;
  if an explicit request is received for web content associated with at least two of the one or more web elements included in the single web page, pre-rendering the web content associated with each of the plurality of web elements included in the single web page; and deleting the pre-rendered web content if the explicit request had been received for the web content.

2. The method of claim 1, further comprising: displaying the web content at the computing device based upon, at least in part, the explicit request for the web content.

3. The method of claim 1, further comprising: delivering the pre-rendered web content to the computing device based upon, at least in part, the explicit request for the web content.

4. The method of claim 1, wherein the web content is linked from the web element.

5. The method of claim 1, wherein the implicit indication includes, at least in part, at least one of: a cursor action associated with the web element, a clicking action associated with the web element, the explicit request for the web content, and accessing the web content.

6. The method of claim 1, wherein the web element is at least one of: text, lines of text, a link, an image, video content, audio content, and the web content.

7. The method of claim 1, wherein pre-rendering the web content is further based upon, at least in part, a navigation profile of the user.

8. The method of claim 1, wherein the pre-rendered web content is stored in a cache until, at least one of: the web content changes after a time frame, and the time frame ends without explicit request for the web content.

9. The method of claim 1, wherein the implicit indication is based upon, at least in part, selection of a key configured, at least in part, to allow the user to launch at least one of: a new web browser window, and a new web browser tab in response to the right clicking action.

10. A computer program product residing on a non-transitory computer readable storage medium having a plurality of instructions stored thereon, which, when executed by a processor, cause the processor to perform operations comprising:

displaying a single web page that includes one or more web elements;

receiving an implicit indication of a request for web content associated with a web element;

pre-rendering the web content associated with the web element based upon, at least in part, the implicit indication of the request for the web content, wherein the implicit indication includes feedback from a camera detecting a specific item viewed by a user, and wherein pre-rendering the web content is further based upon, at least in part, a history of implicitly requested pre-rendered web content;

if an explicit request is received for web content associated with at least two of the one or more web elements included in the single web page, pre-rendering the web content associated with each of the remaining web elements included in the single web page; and deleting the pre-rendered web content if the explicit request had been received for the web content.

11. The computer program product of claim 10, further comprising instructions for: displaying the web content at the computing device based upon, at least in part, the explicit request for the web content.

12. The computer program product of claim 10, further comprising instructions for: delivering the pre-rendered web content to the computing device based upon, at least in part, the explicit request for the web content.

13. The computer program product of claim 10, wherein the web content is linked from the web element.

14. The computer program product of claim 10, wherein the implicit indication includes, at least in part, at least one of: a cursor action associated with the web element, a clicking action associated with the web element, the explicit request for the web content, and accessing the web content.

15. The computer program product of claim 10, wherein the web element is at least one of: text, lines of text, a link, an image, video content, audio content, and the web content.

16. The computer program product of claim 10, wherein pre-rendering the web content is further based upon, at least in part, a navigation profile of the user.

17. The computer program product of claim 10, wherein the pre-rendered web content is stored in a cache until, at least one of: the web content changes after a time frame, and the time frame ends without explicit request for the web content.

18. The computer program product of claim 10, wherein the implicit indication is based upon, at least in part, selection of a key configured, at least in part, to allow the user to launch at least one of: a new web browser window, and a new web browser tab in response to the right clicking action.

* * * * *